United States Patent [19]
Jansto

[11] Patent Number: 5,411,198
[45] Date of Patent: May 2, 1995

[54] CLEAN STEEL TUBING

[75] Inventor: Steven G. Jansto, Bowling Green, Ohio

[73] Assignee: Alpha Tube Corporation, Holland, Ohio

[21] Appl. No.: 186,557

[22] Filed: Jan. 26, 1994

[51] Int. Cl.⁶ ..................... B23K 13/02; B23K 101/06
[52] U.S. Cl. ................................... 228/125; 228/147; 420/9; 420/92
[58] Field of Search ................... 228/125, 147; 420/92, 420/9

[56] References Cited

U.S. PATENT DOCUMENTS 3,975,514  8/1976  Matsukura ..................... 148/12 F

FOREIGN PATENT DOCUMENTS 95389  8/1977  Japan ................................. 228/125

Primary Examiner—Kenneth J. Ramsey
Attorney, Agent, or Firm—Hill, Steadman & Simpson

[57] ABSTRACT

An improved steel tube made from low sulfur steel wherein clean steel flat strip is formed into a circular form with its edges abutting and the edges are heated and pushed together to form a welded tube. The inside and outside beads are removed with cutting tools.

3 Claims, 1 Drawing Sheet

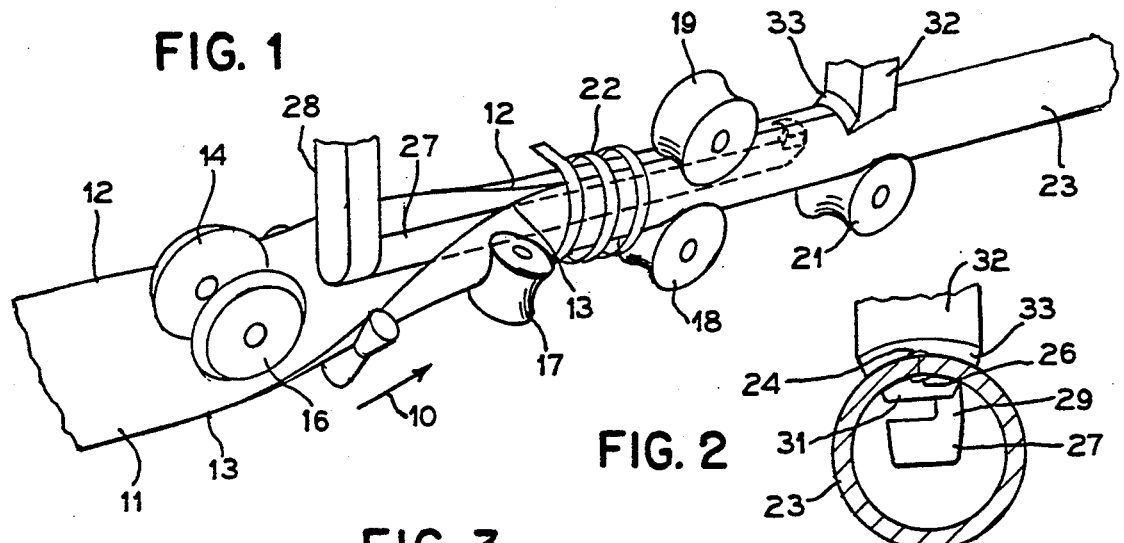
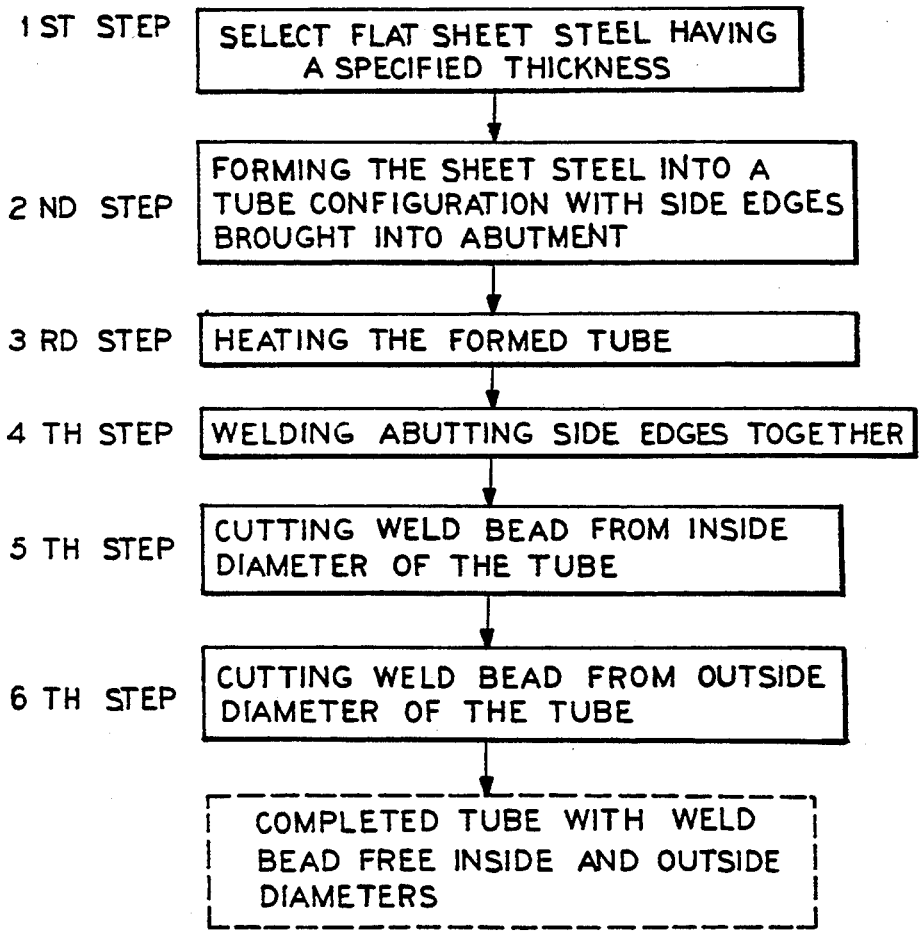

CLEAN STEEL TUBING

BACKGROUND OF THE INVENTION

1. Field of the Invention

This invention relates in general to steel tubing and in particular to steel tubing made by a process of forming low sulfur content steel into a cylinder with the edges abutting, heating the edges and pressing them together so that they are joined and removing the inside bead of the weld with an inside cutter and the outside bead with an external cutter.

2. Description of Related Art

Tubing formed by drawing over a mandrel (DOM) requires the use of a draw bench, a mandrel, and an annealing process. In the process of producing DOM tubing, a tube is manufactured having specified interior and exterior diameters. This tube is then drawn over an internal bar which stretches the tube and gives it a specific ID. Typically, DOM tubing can hold an internal tolerance of approximately 0.005 inch. The tube is drawn over the mandrel so as to obtain the specific ID required and is then annealed so as to relieve stresses and obtain formability. The manufacture of steel tubing using DOM techniques is fairly expensive and the average sale price for electric resistance welded DOM tubing is fairly high. The DOM process is a batch process rather than a continuous process and the DOM process is energy, power and labor intensive.

See also the following U.S. Patents. U.S. Pat. Nos. 4,310,740, 4,354,090, 4,734,981, 4,796,798, 4,830,258, 4,905,885, 5,143,274, 5,148,960, 5,158,227.

SUMMARY OF THE INVENTION

The present invention relates to a novel tube which has superior characteristics and which is made by a process that does not require heat treatment. Sheet steel having a low sulphur level in the raw material steel is passed through a rolling mill to be rolled to a desired thickness as, for example, 0.128 gage+0.001 inch. The steel used in the product of the invention is made using a metallurgical process which results in reduced sulphur levels.

The present invention results in steel tubing which is substantially less expensive or lower cost than drawn over mandrel (DOM) tubing. The steel tubing of the invention is made in a continuous process from "clean" steel (steel with low sulphur content) which results in a steel which is more workable than high sulphur content steel.

The clean steel sheet is formed into a cylinder and the adjacent edges are electrically heated and pushed together so as to weld them. The weld beads on the inside and the outside of the tube are removed by cutting tools.

It is an object of the present invention to provide steel tubing of high quality which is made by a process that is simpler and cheaper than prior art processes.

It is an object of the present invention to provide an improved steel tubing.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view illustrating tubing being made according to the invention;

FIG. 2 is a sectional view illustrating the inside bead cutter and the external bead cutter; and FIG. 3 is a flow diagram illustrating the invention.

DETAILED DESCRIPTION OF THE PREFERRED EMBODIMENTS

FIG. 1 illustrates a steel sheet 13 which has been removed from a roll, not shown, and is moved to the right in the direction of arrow 10 past forming rolls 14 and 16, 17 and 18, 19 and 21 so as to form the sheet steel 11 into a tube by forming its edges 12 and 13 so that they are adjacent each other. It is then passed through an electric heater 22 which heats the material for 30 to 40% of its diameter so that the edges 11 and 12 flow together and are welded together to form a tube 23. An inside cutter 31 which is shown in sectional view 2 engages the inside bead 26 of the weld and removes it to make the inside surface of the tube nearly smooth. The cutter 31 is supported on an extension 29 of an arm 27 supported by a suitable support 28 as shown in FIG. 1 so that the cutter extends into the tube. An external bead cutter 33 is supported on an arm 32 and the cutter blade 33 conforms to the outer curved surface of the tube 23 and removes the external bead 24.

FIG. 3 is a flow diagram of the process of making the improved tubing of the invention.

In a first step, flat sheet steel bring a desired thickness and a specified tolerance is obtained. In a second step, the selected flat sheet steel is formed into a tube configuration with the side edges brought into abutment. In a third step, the tube is heated so as to heat about 30 to 40% of the radius of the tube. In a fourth step, welding is accomplished by abutting the edges together. In a fifth step, the inside bead is cut so as to remove the bead and to establish the desired inside diameter.

In a sixth step, the external bead is removed so as to establish a smooth outside diameter.

One example of the clean steel used in the present invention is given by the following composition.

| ELEMENT | IN % |
| --- | --- |
| Carbon | 0.20 |
| Sulfur | <0.005 |
| Phosphorus | 0.011 |
| Silicon | 0.08 |
| Manganese | 0.40 |
| Chromium | 0.01 |
| Nickel | 0.01 |
| Molybdenum | 0.01 |
| Vanadium | <0.005 |
| Aluminum | 0.042 |
| Copper | 0.01 |
| Cobalt | <0.005 |
| Titanium | <0.005 |
| Zirconium | <0.005 |
| Columbium | <0.005 |
| Tantalum | <0.005 |
| Tungsten | <0.01 |

The invention can also use 1018, 1026 and other steel compositions. The 1020 of the example given herein resulted in an improved and less expensive or lower cost tubing than possible with prior art tubing drawn over a mandrel.

Although the invention has been described with respect to preferred embodiments, it is not to be so limited as changes and modifications can be made therein which are within the full intended scope as defined by the appended claims.

I claim as my invention:

1. A clean steel tubing made by the process of forming steel into a flat strip, forming the flat strip into a circular form with its edges abutting, induction heating the circular formed strip in the vicinity of the abutting edges so as to heat the edges, pressing the heated edges together so that they are joined by welding to form a tube, removing the inner weld bead with a first cutting tool supported within the tube, and removing the outer weld bead with a second cutting tool so as to smooth the outer surface and wherein the steel consists of:

| | |
|---|---|
| Carbon | 0.20% |
| Sulfur | <0.005% |
| Phosphorus | 0.011% |
| Silicon | 0.08% |
| Manganese | 0.40% |
| Chromium | 0.01% |
| Nickel | 0.01% |
| Molybdenum | 0.01% |
| Vanadium | <0.005% |
| Aluminum | 0.042% |
| Copper | 0.01% |
| Cobalt | <0.005% |
| Titanium | <0.005% |
| Zirconium | <0.005% |
| Columbium | <0.005% |
| Tantalum | <0.005% |
| Tungsten | <0.01% | and does not contain any rare earth elements.

2. The process of making clean steel tubing comprising the steps of, selecting steel consisting of:

| | |
|---|---|
| Carbon | 0.20% |
| Sulfur | <0.005% |
| Phosphorus | 0.011% |
| Silicon | 0.08% |
| Manganese | 0.40% |
| Chromium | 0.01% |
| Nickel | 0.01% |
| Molybdenum | 0.01% |
| Vanadium | <0.005% |
| Aluminum | 0.042% |
| Copper | 0.01% |
| Cobalt | <0.005% |
| Titanium | <0.005% |
| Zirconium | <0.005% |
| Columbium | <0.005% |
| Tantalum | <0.005% |
| Tungsten | <0.01% | and does not contain any rare earth elements, forming said steel into a flat strip, forming said flat strip into a tubular form with the edges abutting, heating said tubular form so as to heat said abutting edges, pressing said heated abutting edges together to form a tube, and removing the inner weld bead from the tube.

3. The process of making clean steel tubing according to claim 2, including the further step of removing the external weld bead from said tube.

* * * * *